(No Model.)
J. E. RATCLIFF.
HARVESTER CUTTER BAR.
No. 318,802. Patented May 26, 1885.
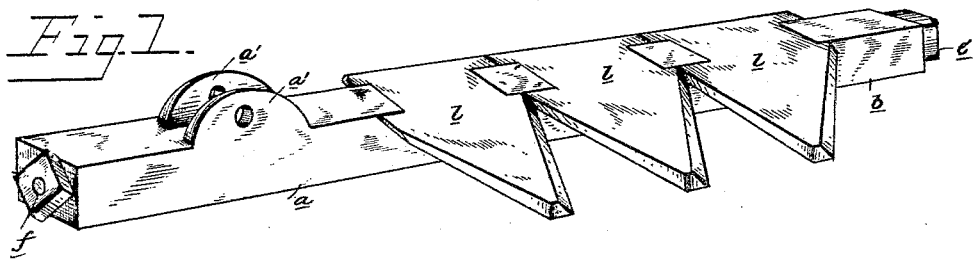
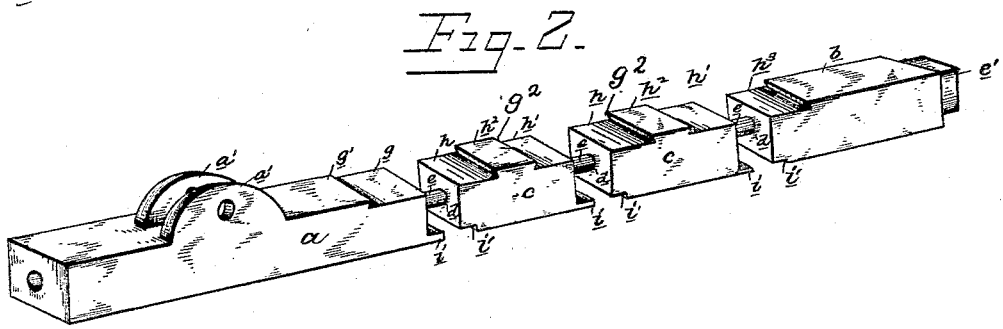
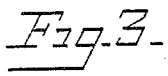
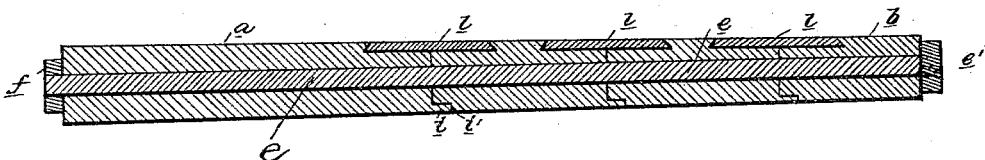
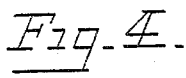
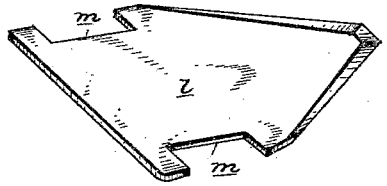
WITNESSES
C. W. Dashiell
E. G. Siggers
James E. Ratcliff
INVENTOR
by, C. A. Snow & Co.
Attorneys

UNITED STATES PATENT OFFICE.

JAMES ELMORE RATCLIFF, OF DAWSON, ILLINOIS, ASSIGNOR OF ONE-HALF TO JOHN McGINNIS, OF SAME PLACE.

HARVESTER CUTTER-BAR.

SPECIFICATION forming part of Letters Patent No. 318,802, dated May 26, 1885.

Application filed March 26, 1884. (No model.)

*To all whom it may concern:*

Be it known that I, JAMES E. RATCLIFF, a citizen of the United States, residing at Dawson, in the county of Sangamon and State of Illinois, have invented a new and useful Harvester Cutter-Bar, of which the following is a specification, reference being had to the accompanying drawings.

This invention has relation to harvester cutter-bars for reapers and mowers; and it consists in the construction and novel arrangement of parts, as will be hereinafter fully described, and particularly pointed out in the claims.

Figure 1 is a view in perspective of my improved cutter-bar, showing the knives secured in place in the bar. Fig. 2 is a view in perspective, showing the knives removed from their seats in the bar, and the sections of which the bar is composed separated on the connecting-rod. Fig. 3 is a vertical longitudinal sectional view, and Fig. 4 is a perspective view of one of the knives.

Referring by letter to the accompanying drawings, $a$ designates the heel-section of the cutter-bar, provided with the lugs $a'\,a'$, through which it is connected to the pitman. $b$ is the toe-section of the cutter-bar, and $c$ the intermediate sections. The sections are all bored longitudinally at or near their middle line, and through these aligned bores $d$ is passed a rod, $e$, having a head, $e'$, at the outer end of the toe-section and a threaded projecting end at the outer end of the heel-section, upon which a tightening-nut, $f$, is screwed, to permit the several cutter-bar sections to be moved laterally upon the rod, and to jam them together thereon and hold them firmly together when the knives are in place in their seats in the bar.

A half-seat, $g$, is made in the upper face of the heel-section at its inner end, and is bounded at its outer end by an under-bevel shoulder, $g'$. The intermediate sections, $c$, have each two half-seats, $h$ and $h'$, separated, so as to be at opposite ends of the sections, by a rectangular projection, $h^2$, having under bevels $g^2$ at each end.

The toe-section has a half-seat, $h^3$, at its inner end, having an under-bevel shoulder at the outer end of the half-seat.

The heel-section $a$ is provided at its inner end, at its under face, with a projection, $i$, which enters a rabbet, $i'$, in the next section, and forms a lap-joint between the sections. The intermediate sections have the lap-projections $i$ at one end and the rabbets $i'$ at the other end at their lower faces, and the inner end of the toe-section is also provided with a rabbet, $i'$, so that the joints between the sections are all lap-joints, and prevent the sections, when connected, from turning on the rod, and also from turning thereon when the sections are disconnected at their ends to permit the introduction or removal of the knives from their seats between the sections, the lap-joints at this time not being entirely separated, but simply slightly extended.

The knives $l$ have notches $m\,m$ in the opposite edges of their shanks, and the longitudinal edges of the notches $m\,m$ are beveled to fit the under bevels of the shoulders on the bar-sections.

By this construction I am enabled to secure the knives in their seats in the cutter-bar without the use of rivets or bolts, and the knives may be easily and quickly removed from the bar to be ground or sharpened and again replaced by simply loosening the nut at the heel of the cutter-bar, slightly separating the sections, so that the knives may be lifted out and ground, then returned to place, and the nut turned up to jam the cutter-bar sections together.

This cutter-bar is simple, cheap, and durable, and is not likely to get out of order.

Having thus fully described my invention, what I claim as new, and desire to secure by Letters Patent of the United States, is—

1. A harvester cutter-bar made in sections bored longitudinally, the sections having lap-projections at one end and a corresponding rabbet at the opposite end, on their under sides, and knife-seats formed in the upper face at the meeting ends of the sections, the connecting-rod passed through the aligned bores of the bar-sections and secured in place by a tightening-nut, whereby the knives may be removably secured in their seats without rivets or bolts, and the sections prevented from turning on the connecting-rod, substantially as described.

2. The combination of the heel-section $a$, the toe-section $b$, the intermediate sections, $c$, the knives $l$, and the connecting-rod $e$, passing through the aligned bores of the sections, the sections having the lap-projections $i$ and rabbets $i'$ on their under sides, and the under-beveled shouldered knife-seats on their upper sides at their meeting ends, and the knives having notches $m$ in the opposite edges of their shanks, said notches being beveled to fit the under-beveled shoulders of the seats of the bar-sections, substantially as described.

In testimony that I claim the foregoing as my own I have hereto affixed my signature in presence of two witnesses.

JAMES ELMORE RATCLIFF.

Witnesses:
WILL. R. JONES,
W. R. CONSTANT.